July 6, 1965 D. F. JAMIESON ETAL 3,193,732

TONE CONTROLLED RELAY CIRCUIT

Filed Jan. 2, 1962

INVENTORS.
DONALD F. JAMIESON
FRANK NIERTIT
BY Robert L. Nathans
ATTORNEY

United States Patent Office 3,193,732

Patented July 6, 1965

3,193,732

TONE CONTROLLED RELAY CIRCUIT

Donald F. Jamieson and Frank Niertit, Rochester, N.Y., assignors to General Dynamics Corporation, Rochester, N.Y., a corporation of Delaware Filed Jan. 2, 1962, Ser. No. 163,557
6 Claims. (Cl. 317—147)

The present invention relates to relay control circuits and, more particularly, to circuits which actuate a relay in response to the reception of a tone signal.

In the communications field, it is common to utilize A.C. tones of various frequencies for energizing relays during the duration of the tone. It is important to actuate the relay almost immediately upon the reception of the tone and only for the duration of the tone. Should the relay remain operated for a period after the reception of the tone, serious variations will occur in the percentage make time of the relay. When the tone is picked off of a transmission channel by a band-pass filter, "overshoot" and elongation of tone is often produced by the filter which may unduly extend the make time of the controlled relay. This "overshoot" is caused by frequency distortion and the generation of spurious oscillations in the filter. To complicate matters, the amplitude of the "overshoot" varies with the amplitude of the tone signal. Also, the electrical inertia of prior art circuitry causes a delay in the turn-on and turn-off time of the relay to further cause deviations in the make time of the relay.

Accordingly, it is the principal object of the present invention to provide a new and improved tone actuated relay control circuit.

It is a further object of the present invention to provide a new and improved tone actuated relay control circuit which causes the energization of a relay almost immediately upon receipt of a control tone and which causes the relay to be deenergized almost immediately upon cessation of the tone regardless of elongation of the tone owing to filter induced "overshoot."

Further objects and advantages of the invention will become apparent as the following description proceeds, and the features of novelty which characterize the invention will be pointed out with particularity in the claims annexed to and forming a part of this specification.

Figure 1:
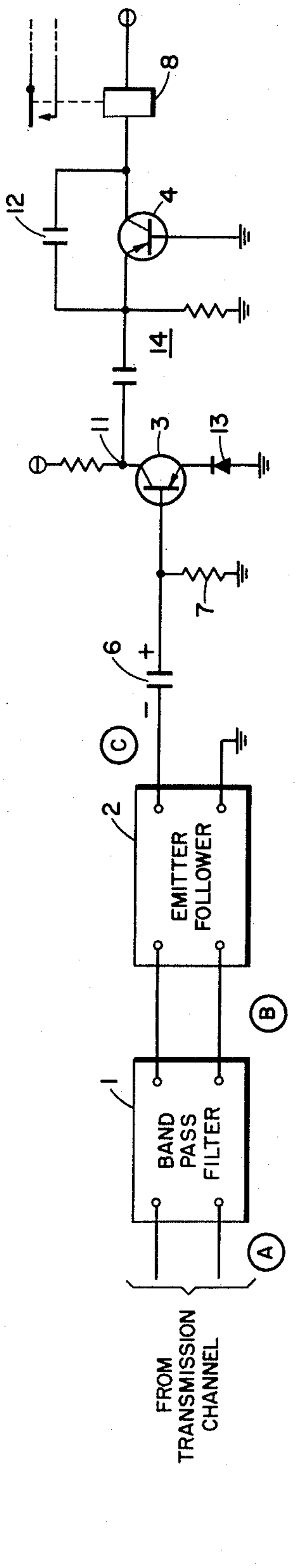

For a better understanding of the invention, reference may be had to the accompanying drawing in which:

FIG. 1 discloses a preferred embodiment of the present invention; and

Figure 2:
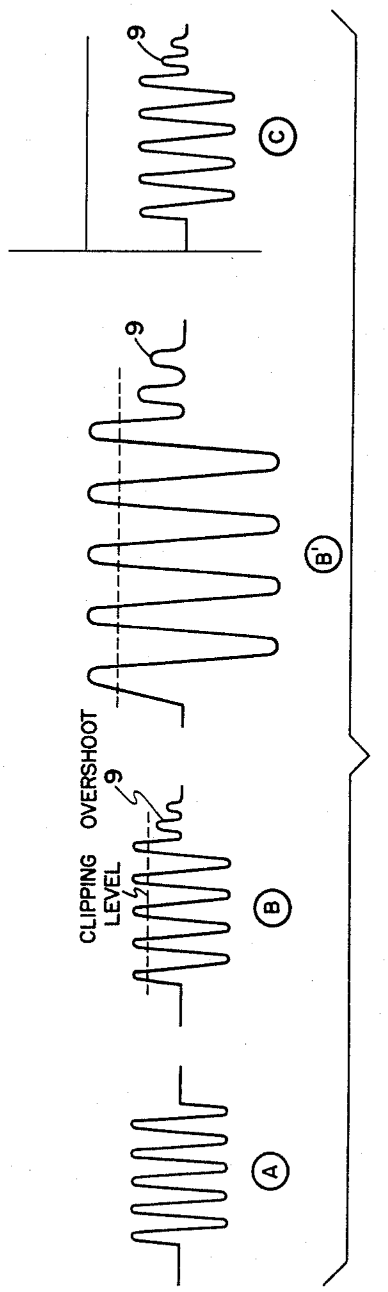

FIG. 2 discloses pulse diagrams which may aid in the understanding of the operation of the circuit disclosed in FIG. 1.

In accordance with the present invention, a clipping circuit is coupled to the input circuit of a transistorized switch which controls the energization of a controlled relay. Clipping is provided in order to eliminate relay actuation due to relatively low level noise. As the amplitude of the control tone signal increases, the amplitude of the "overshoot" signal increases. If a fixed clipping level were utilized, the "overshoot" accompanying large amplitude control tones would cause the relay to remain energized after cessation of the tone, thereby to severely alter the make time of the relay. The present invention prevents this from happening since the clipping level of the aforementioned clipping circuit varies with the amplitude of the control tone. In other words, the clipping level is always made to be higher than the amplitude of the "overshoot" signal. In addition, a capacitor is connected across the relay switching transistor to reduce the turn-on and turn-off time of the transistorized switch by utilizing back E.M.F. produced across the relay winding as the transistor changes state.

Referring now to FIG. 1 of the drawing, band-pass filter 1 is shown coupled between a transmission channel, which may transmit numerous tones of various frequencies, and emitter follower circuit 2 which, in turn, is coupled to switching stage 3 through capacitor 6 and resistor 7. Stage 3 is coupled to transistorized switch 4 through a coupling network as shown. The emitter follower provides an impedance match and high current drive for the clipping circuit.

FIG. 2A discloses a pulse diagram of a tone signal applied to band-pass filter 1. FIG. 2B discloses the tone as it often appears at point B in the circuit. A spurious "overshoot" signal 9 is now appended to the tone of FIG. 2A due to the action of filter 1. As shown in FIG. 2B', as the tone amplitude increases, the amplitude of "overshoot" signal 9 increases and, accordingly, the clipping level must increase, in order to make sure that the enlarged "overshoot" signal 9 cannot maintain the relay in an energized state after cessation of the tone.

The application of the tone signal of the proper frequency to band-pass filter 1 causes a fluctuating D.C. signal to be produced in the output circuit of emitter follower 2, as shown in FIG. 2C. Again, variations in the amplitude of the fluctuating signal produced at point C will cause corresponding variations in the amplitude of the overshoot portion 9. Capacitor 6 will be charged negatively by the negative-going portions of the signal of FIG. 2C through the emitter base junction of transistor 3 and through diode 13. On the other hand, capacitor 6 will be charged positively by the positive-going portion of the signal of FIG. 2C through resistor 7. Capacitor 6 cannot charge positively through diode 13 or the emitter base junction of transistor 3 since positive-going swings of the aforementioned signal will back bias diode 13 and the emitter base junction of transistor 3. After a few cycles, the left-hand plate of capacitor 6 will be negative relative to the right-hand plate because the RC time constant of the negative charge circuit (diode 13 and the emitter base junction of transistor 3) is considerably smaller than the RC time constant of the positive charge path of capacitor 6 through resistor 7. In other words, for each negative-going excursion of FIG. 2C, capacitor 6 will rapidly charge negatively, but will discharge by virtue of the positive-going swings of the signal of FIG. 2C reluctantly owing to the larger time constant of the RC circuit comprising resistor 7 and capacitor 6. It should, therefore, be apparent that the greater the amplitude of the signal of FIG. 2C, the greater the negative charge across capacitor 6 and, therefore, the greater the amplitudes of the negative-going excursions of the signal of FIG. 2C must be in order to overcome the negative voltage across capacitor 6 to thereby turn on transistor 3. Accordingly, the clipping level is raised with increases in the amplitudes of the fluctuating D.C. signals applied to capacitor 6. On the other hand, should the amplitudes of these signals decrease, capacitor 6 will partially discharge until a new equilibrium is reached. Accordingly, the clipping level is raised as shown in FIG. 2B' with increases in tone amplitude and, conversely, the clipping level is decreased with decreases in tone amplitude.

The clipped signal is applied across the emitter base junction of transistor 4 via RC coupling network 14. As a result, bursts of current pass through relay coil 8, thereby to actuate the relay. Relay coil 8 acts as an electrical flywheel and will remain energized as long as these bursts are applied to coil 8.

Capacitor 12 is connected between the collector and emitter of transistor 4, as shown. When the first burst of current is applied to relay coil 8, a back E.M.F. is produced across the coil so that the collector goes sharply positive. This signal passes through capacitor 12 thereby to cause the emitter of transistor 4 to go sharply positive which speeds up the turning on of transistor 4 and greatly reduces its electrical inertia. On the other hand, when transistor 4 is switched into a state of non-conduction, the collapsing flux in the relay coil causes a negative pulse to pass through capacitor 12 which reduces the turn-off time of transistor 4 by sharply back biasing the transistor.

In summary, a variable level clipper is utilized in the relay control circuit of the present invention to eliminate the detrimental effect of elongation of the tone signal by virtue of overshoot which increases with increasing tone amplitudes. Accordingly, the relay is deenergized promptly upon cessation of the tone regardless of overshoot. In addition, the relay is promptly actuated upon receipt of the tone owing to the utilization of back E.M.F. produced in the relay coil.

While there has been disclosed what is at present considered to be the preferred embodiment of the invention, other modifications will readily occur to those skilled in the art. It is not, therefore, desired that the invention be limited to the specific arrangement shown and described and it is intended in the appended claims to cover all such modifications as fall within the true spirit and scope of the invention.

What is claimed is:

1. In a tone control circuit, a transmission channel, a filter coupled to said transmission channel for detecting a tone transmitted by said transmission channel, a switching device for assuming a first state upon the receipt of said tone and for assuming a second state upon the cessation of said tone, means having an input circuit coupled to the output circuit of said filter and having an output circuit coupled to said switching device for maintaining said switching device in said first state during the application of said tone to said tone control circuit, said last-named means further including a clipper having a clipping level which varies proportionately with the strength of said tone.

2. The combination as set forth in claim 1 wherein said filter is a band-pass filter which has a band-pass permitting the passage of said tone.

3. The combination as set forth in claim 1 wherein said switching device further comprises a relay coil, a current control device having an input circuit and an output circuit, means for connecting said relay coil in series with the output circuit of said current control device, and a capacitor coupled between the input circuit and the output circuit of said current control device for reducing its turn-on and turn-off time.

4. The combination as set forth in claim 2 wherein said switching device further comprises a relay coil, a current control device having an input circuit and an output circuit, means for connecting said relay coil in series with the output circuit of said current control device, and a capacitor coupled between the input circuit and the output circuit of said current control device for reducing its turn-on and turn-off time.

5. In a relay control circuit, a coil, a transistor having an emitter, base and collector, a control signal source, a source of operating potential, means for coupling said signal source to said emitter and for coupling said coil with said collector and said source of operating potential in a common base configuration, and means coupled between said emitter and said coil for transferring at least a portion of the back-E.M.F. developed within said coil to said emitter to decrease the turn-on and turn-off time of said current control device.

6. The combination as set forth in claim 5 wherein said last-named means comprises a capacitor.

References Cited by the Examiner

UNITED STATES PATENTS

| | | | |
|---|---|---|---|
| 2,890,352 | 6/59 | Goodrich. | |
| 2,928,002 | 3/60 | Havstad | 317—149 |
| 3,042,839 | 7/62 | Hermes | 317—148.5 X |
| 3,049,650 | 8/62 | Greenblatt | 317—148.5 |
| 3,084,265 | 4/63 | Cleland. | |
| 3,098,180 | 7/63 | Smith. | |

SAMUEL BERNSTEIN, *Primary Examiner.*